May 8, 1923.
W. R. LAYNE
SHAFT BEARING
Filed Aug. 15, 1921
1,454,682
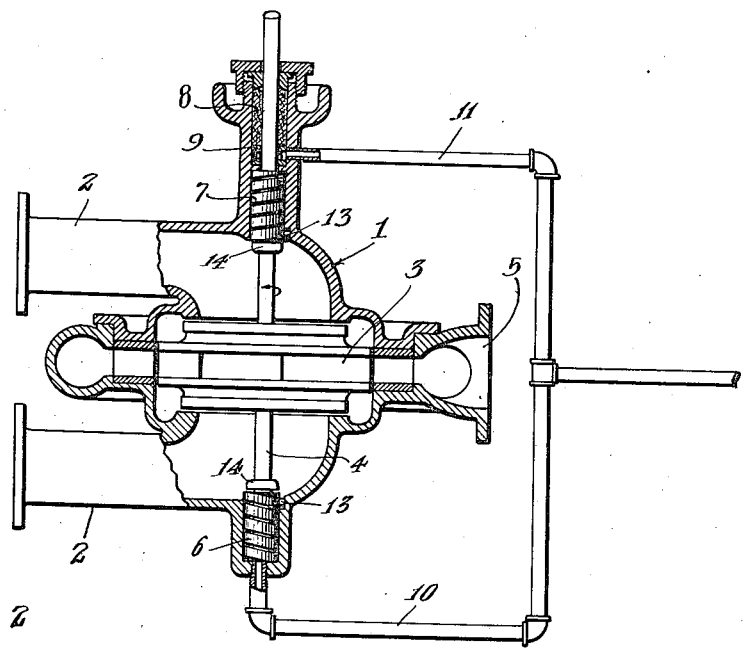
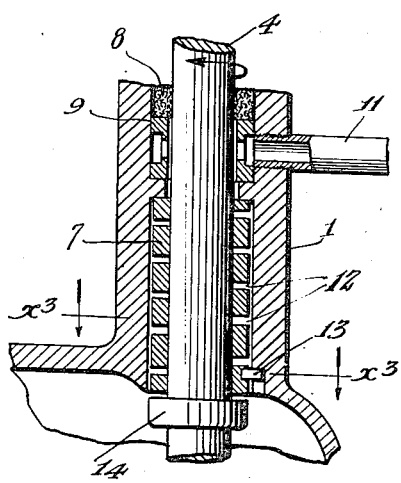
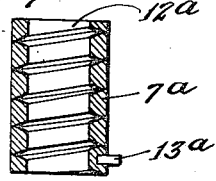
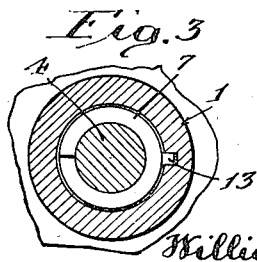
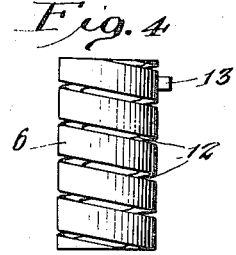
Inventor
William Robert Layne
By Frederick Whyper
Atty.

Patented May 8, 1923.

1,454,682

UNITED STATES PATENT OFFICE.

WILLIAM ROBERT LAYNE, OF RICHMOND, CALIFORNIA, ASSIGNOR TO STANDARD OIL COMPANY, OF SAN FRANCISCO, CALIFORNIA, A CORPORATION OF CALIFORNIA.

SHAFT BEARING.

Application filed August 15, 1921. Serial No. 492,365.

*To all whom it may concern:*

Be it known that I, WILLIAM ROBERT LAYNE, a citizen of the United States, residing at Richmond, in the county of Contra Costa and State of California, have invented a new and useful Shaft Bearing, of which the following is specification.

This invention relates to shaft bearings and has for its object to provide a new type of bearing constructed of relatively flexible material and which will automatically accommodate itself to variations in the diameter of the shaft due to temperature changes; to provide a bearing which will automatically vary in diameter coincident with variations of friction between the shaft and bearing; to provide a cylindrical bearing of helical form with one end thereof maintained against rotation and the convolutions of the bearing extending from said fixed end in a direction reverse to the direction of shaft rotation whereby the helix unwinds and winds coincident to variations of friction between the shaft and bearing; to provide a yielding bearing automatically accommodating itself to all variations of temperature and friction; and to provide a helical bearing which by its helical formation provides a continuous unobstructed oil channel throughout its length, whereby cooling and lubricating fluids may be transmitted through the bearing and around the shaft in the direction of shaft rotation.

Various other objects and advantages will be more fully apparent from the following description of the accompanying drawings which form a part of this disclosure and which illustrate a preferred form of embodiment of the invention.

Of the drawings:

Figure 1 is a section through a rotary oil pump showing one installation of the bearing of the present invention.

Fig. 2 is an enlarged section of the upper bearing in Fig. 1.

Fig. 3 is a section on line $x^3$—$x^3$ of Fig. 2.

Fig. 4 is an elevation of the lower bearing in Fig. 1.

Fig. 5 is a vertical section through a modified form of bearing.

In Fig. 1 I have shown a centrifugal pump provided with bearings made in accordance to the present invention, such pump being of a type used in circulating hot oil in oil cracking or treating systems; and while this type of bearing is especially adapted for use in a pump of this character where relatively high temperatures are encountered it is shown in this connection only as an illustration of one of its uses, it being evident that it is equally as adaptable to various other uses as a bearing for rotating shafts or other cylindrical machine elements.

In general terms the pump shown in Fig. 1 comprises a pump housing 1 having inlets 2—2, a centrifugal rotor 3 driven by a shaft 4, and a discharge 5. The shaft rotates in the bearings 6—7 which are positioned in opposed bearing recesses in the housing 1, and in the present instance one end of the shaft extends through a suitable packing box 8. In the base of the packing box recess is a cage element 9 having a bore larger than the diameter of the shaft and having perforated side walls permitting lubricating fluid to pass to the shaft, the bore in the wall separating the packing box recess from the adjacent bearing recess being larger than the diameter of the shaft to permit the fluid to enter the bearing recess axially of the shaft.

The cool lubricating fluid is supplied to the respective shaft bearings through the supply pipes 10—11, the oil being fed to the bearings by pressure or by gravity as desired. The bearings shown in Fig. 1 are of duplicate construction, each being of helical form with the convolutions spaced to form a continuous helical oil channel 12 extending throughout the length of the bearing. The diameter of the bore of the bearing is of a size allowing the usual running fit of the shaft 4 therein and the external diameter of the bearing is slightly less than the diameter of the bearing recess to allow for diametrical expansion of the bearing.

Near one end the bearing has a pin or key 13 which engages within a key slot or notch in the wall of the bearing recess when the bearing is in position, said engagement of the key 13 in the key slot maintaining one end of the bearing against rotation with the convolutions of the bearing extending from said fixed end in a direction reverse to the direction of shaft rotation. If desired the shaft 4 may be provided with shoulders 14 to prevent the bearings from working out of their respective bearing recesses in the housing.

With the oil channel 12 extending in a helical direction around the shaft and throughout the length of the bearing it will be evident that the oil entrained through said channel will wash from the bearing any particles of dirt, grit or other foreign substances.

The bearing is constructed of relatively flexible material and under normal conditions the oil is fed through the bearing in a continuous helical stream not only adjacent the shaft but between the convolutions of the bearing, this oil circulation assisting very materially in preventing an overheating of the bearings.

As previously explained the convolutions of the bearing extend in a direction reverse to the direction of shaft rotation from the fixed end of the bearing to its free end and with this construction in mind it should be easily understood that with any increase above normal in friction between the bearing and shaft, due to changes of temperature of the parts or to retarded oil supply, said increased friction will tend to unwind the convolutions of the bearing. Such unwinding of the bearing will increase its diameter providing a greater degree of clearance between the bearing and shaft to reduce the friction and allowing a greater supply of lubricating fluid to flow through the bearing.

In Fig. 5 I have illustrated a modified form of bearing 7ª in which the adjacent inner edges of the convolutions are beveled and the convolutions engage each other coil on coil. This structure provides the continuous oil channel 12ª functioning in the same manner as the oil channel 12 of the previously described form of bearing. This form of bearing may be advantageously employed in such instances as it is desired to utilize a cylindrical bearing having a continuous outer peripheral wall.

From the above it will be seen that my improved bearing will maintain a desired normal running condition of the shaft, by automatically adjusting itself coincident to any increase in friction between the shaft and bearing and in proportion to temperature changes of the parts, and further my improved bearing maintains a constant flushing circulation of cooling and lubricating fluid throughout its length materially amplifying the cooling and lubricating efficiency of the fluid which also acts as a conveying medium for removing dirt, grit or other foreign matter from the bearing.

With this description of my preferred form of structure it is to be understood that present invention embraces such modifications thereof as may be included within the scope of the following claims.

I claim:

1. A shaft bearing of helical formation having a fixed end and a freely rotatable end and providing a continuous helical oil channel between the convolutions.

2. A shaft bearing of helical formation having means at one end of the helix adapted to engage a bearing support to prevent said end from rotating, the opposite end being free to rotate under abnormal frictional influences.

3. In combination with a bearing support and a rotary shaft, a bearing of helical formation surrounding the shaft and having means at one end of the helix adapted to engage the support to prevent said end from rotating, the opposite end being free to rotate under abnormal frictional influences.

4. In combination with a bearing support and a rotary shaft, a bearing of helical formation surrounding the shaft and having means at one end of the helix adapted to engage the support to prevent said end from rotating, the opposite end being free to rotate and the convolutions of the bearing extending from said non-rotative end to its free end in a direction reverse to the direction of shaft rotation.

5. A flexible shaft bearing of helical formation having a nonrotative end and a freely rotatable end with its convolutions extending from said end in a direction reverse to the direction of shaft rotation.

6. A flexible metallic shaft bearing of helical formation wound coil upon coil and with the convolutions formed to provide a helical oil channel in its inner peripheral surface extending throughout the length of the bearing.

7. In combination with a bearing support and a rotary shaft, a flexible metallic bearing of helical formation surrounding the shaft and having means at one end of the helix adapted to engage the support to prevent said end from rotating, the convolutions of the bearing extending from said end in a direction reverse to the direction of shaft rotation, the opposite end being free to be rotated by frictional influences whereby the bearing will automatically unwind to a larger diameter under increased friction influences to provide an increased clearance between the shaft and bearing.

Signed at Richmond, California, this 2nd day of August, 1921.

WILLIAM ROBERT LAYNE.

Witnesses:
FREDERICK S. LYON,
R. W. HANNA.